United States Patent [19]

Itoh et al.

[11] Patent Number: 5,202,400
[45] Date of Patent: Apr. 13, 1993

[54] PROCESS FOR THE PRODUCTION OF HIGHLY WATER ABSORPTIVE POLYMERS

[75] Inventors: Kiichi Itoh; Shuhei Yada; Kenji Yoshinaga, al of Yokkaichi, Japan

[73] Assignee: Mitsubishi Petrochemical Company Limited, Tokyo, Japan

[21] Appl. No.: 746,991

[22] Filed: Aug. 19, 1991

[30] Foreign Application Priority Data

Aug. 21, 1990 [JP] Japan .................. 2-219454

[51] Int. Cl.$^5$ .............. C08F 30/04; C08F 2/24; C08F 2/32
[52] U.S. Cl. ..................... 526/240; 526/61; 526/207; 526/303.1; 526/317.1
[58] Field of Search .............. 526/207, 240, 61, 317.1, 526/303.1

[56] References Cited

U.S. PATENT DOCUMENTS

| | | | |
|---|---|---|---|
| 4,037,040 | 7/1977 | Trapasso | 526/88 |
| 4,497,930 | 2/1985 | Yamasaki | 524/556 |
| 4,880,886 | 11/1989 | Kondo | 526/80 |

FOREIGN PATENT DOCUMENTS 0176664 4/1986 European Pat. Off. .
0234202 9/1987 European Pat. Off. .

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

A process for producing a highly water absorptive polymer by polymerizing a water-soluble, ethylenically unsaturated monomer in a water-in-oil type of dispersion consisting of the dispersion phase of an aqueous monomer solution comprising the water-soluble, ethylenically unsaturated monomer, water, a water-soluble polymerization initiator and an optional water-soluble crosslinking agent and the continuous phase of an organic solvent containing a dispersant, characterized in that the aqueous monomer solution is added to the organic solvent at such a temperature as to form an oil-in-water type of dispersion, and the oil-in-water type of dispersion is then heated at least to a phase reversal temperature at which it is transformed into the water-in-oil type of dispersion.

8 Claims, No Drawings

PROCESS FOR THE PRODUCTION OF HIGHLY WATER ABSORPTIVE POLYMERS

BACKGROUND OF THE INVENTION

1. Field of the Invention

This invention relates to a process for producing highly water absorptive polymers which are obtained in a spherical form having a large particle size, have a very narrow particle size distribution, are free-flowing due to very little content of residual organic solvent and are of extremely high fluidity.

The highly water absorptive polymers obtained by the process of this invention are insoluble in water and are swollen by absorbing much water. The polymers are in a spherical form having a large particle size with a very narrow particle size distribution. Further, the polymers are free-flowing due to a very small content of organic solvent residues and are thus of extremely high fluidity and, therefore, they can be easily handled with great safety. Accordingly, the polymers obtained by the process of the present invention are advantageously used for various absorbent materials and various materials which are used in the swollen state with water being absorbed.

2. Background Art

Reverse-phase suspension polymerization techniques for producing highly water absorptive polymers by polymerizing a water-soluble ethylenically unsaturated monomer in the dispersion phase of an aqueous monomer solution in the continuous phase of an organic solvent substantially incompatible with the aqueous solution phase and in the presence of a dispersant have been generally well known in the art, and some polymerization techniques characterized by the types of dispersant and organic solvent used, polymerization conditions and other factors have been reported. For instance, there have been known techniques in which as the dispersants use are made of:

nonionic surfactants having an HLB of 3–6 (see Japanese Patent Publication No. 54-30710 and Japanese Patent Kokai Publication No. 61-157513);

nonionic surfactants having an HLB of 6–9 (see Japanese Patent Kokai Publication No. 57-167302);

nonionic surfactants having an HLB of 8–12 (see Japanese Patent Publication No. 60-25045);

polyglycerin fatty acid esters having an HLB of 2–16 (see Japanese Patent Kokai Publication No. 62-172006);

sucrose fatty acid esters (see Japanese Patent Kokai Publications Nos. 61-87702 and -43606);

cellulose esters or ethers (see Japanese Patent Kokai Publication No. 57-158210);

methacrylic acid-methyl methacrylate-2-ethylhexyl acrylate copolymers, products obtained by the reaction of maleic anhydride-modified polybutadiene with 2-hydroxyethyl methacrylate, polybutadiene-butyl methacrylate-methacrylic acid graft copolymers, ethylenepropylene-diene monomer copolymers grafted by $\alpha,\beta$-unsaturated carboxylic acids and alkyl esters or hydroxyalkyl esters of $\alpha,\beta$-unsaturated carboxylic acids, and so on (see Japanese Patent Kokai Publication No. 57-94011); and copolymers of $\alpha$-olefins with $\alpha,\beta$-unsaturated polyvalent carboxylic anhydrides or their derivatives (Japanese Patent Kokai Publication No. 62-95308).

The polymers obtained by these methods take the form of a relatively large sphere, as expressed in terms of a primary particle size of a few $\mu m$ to a few hundreds $\mu m$, but they have a relatively wide particle size distribution, because the so-called "fine powdery polymer" having a particle size of a few tens $\mu m$ or below are unavoidably produced. Thus, such dust-preventing measures as used in handling dust are needed. It is also generally said that as the content of the fine powdery polymer increases, the so-called "gel blocking" phenomenon is more likely to occur in absorbing the fluid to be treated, thus rendering such absorption very difficult. In addition, when such water-absorbing polymers are mixed with and retained by pulverized pulp, unwoven fabrics or the like, for example, with a view to using them as paper diapers or sanitary napkins, there is a problem that the fine powdery polymer tends to peel off.

In addition, it is unavoidable that the polymers obtained by the above-mentioned reverse-phase suspension polymerization methods contain the organic solvent used in the polymerization generally in an amount of a few tens to a few hundreds weight ppm or, in the worst case, as high as a few thousands weight ppm. Thus, such water-absorbing polymers present a serious safety problem, esp., when used as the materials for sanitary goods such as paper diapers or sanitary napkins.

Furthermore, when such a large amount of organic solvents remains in a polymer product, the powder particles are generally more likely to stick to each other. This presents a grave problem that their fluidity deteriorates when they are transported in the powdery form; it is impossible to transport them in a quantitative manner, for example in the production of paper diapers or sanitary napkins.

SUMMARY OF THE INVENTION

As a result of intensive studies made to provide a solution to the above-mentioned problems, the inventors have found that a spherical polymer having high water absorption properties, which consists of very large primary particles and has a narrow particle size distribution and a very limited content of residual organic solvent, can be obtained with ease and at a low cost by carrying out the polymerization of a water-soluble unsaturated monomer in a dispersion system which is prepared by first adding and mixing an aqueous monomer solution to and with an oil phase to form an oil-in-water type of dispersion and, thereafter, transforming the oil-in-water type of dispersion into a water-in-oil type of dispersion, and have thus accomplished the present invention.

Thus, the present invention provides a process for producing a highly water absorptive polymer by polymerizing a water-soluble, ethylenically unsaturated monomer in a water-in-oil type of dispersion consisting of the dispersion phase of an aqueous monomer solution comprising the water-soluble, ethylenically unsaturated monomer, water, a water-soluble polymerization initiator and an optional water-soluble crosslinking agent and the continuous phase of an organic solvent containing a dispersant, characterized in that said aqueous monomer solution is added to said organic solvent at such a temperature as to form an oil-in-water type of dispersion, and the oil-in-water type of dispersion is then heated at least to a phase reversal temperature at which it is transformed into said water-in-oil type of dispersion.

The highly water absorptive polymer obtained by the process of the invention is excellent especially in that it has a very large primary particle size and a narrow particle size distribution, and further it contains a residual organic solvent in such a small amount that it is free-flowing and has a remarkably improved fluidity.

Making use of its excellent handleability and safeness, the polymer produced by the process of the invention can be advantageously used for various sanitary goods including sanitary napkins and paper diapers as well as for a variety of horticultural and agricultural materials including soil conditioners and water retention agents.

As already stated, the polymerization method according to the present invention is characterized in that the reverse-phase suspension polymerization of a water-soluble ethylenically unsaturated monomer is conducted in a water-in-oil type of dispersion which is prepared by first forming an oil-in-water type of dispersion and then effecting the phase inversion thereof. It should be quite unexpected that the means of phase reversal employed in the process of the present invention produce such great advantages as mentioned above with respect to the resulting polymer.

DETAILED DESCRIPTION OF THE INVENTION

Water-Soluble, Ethylenically Unsaturated Monomer

According to the present invention, any water-soluble, ethylenically unsaturated monomer capable of providing a polymer having water absorption capacity may be used. Such monomers may include ethylenically unsaturated monomers containing as the functional group a carboxylic acid and/or its salt, a phosphoric acid and/or its salt, a sulfonic acid and/or its salt, or a hydroxyl or amide group. More specifically, mention may be made of (meth)acrylic acid (salt), itaconic acid (salt), vinyl sulfonic acid (salt), vinyl phosphonic acid (salt), polyethylene glycol (meth)acrylate, (meth)acrylamide, and so on. It is noted that the wording "(meth)acrylic" refers to both acrylic and methacrylic. These monomers may be used alone or in combination of two or more. Especially, water-soluble, ethylenically unsaturated monomers containing carboxylic acid (salt) as the functional group are preferred, and acrylic acid and/or methacrylic acid and/or alkali metal or ammonium salts thereof are more preferred. The most preferable water-soluble, ethylenically unsaturated monomer to be used in the present invention is one which comprises as a main component acrylic acid with 50–95% of the total carboxyl groups neutralized into its alkaline metal or ammonium salt.

These water-soluble, ethylenically unsaturated monomers may be present at a concentration of generally 10% by weight or more, preferably 20% by weight to the saturation concentration, in the aqueous monomer solution.

Organic Solvent and Dispersant

As the organic solvent and the dispersant, use may be made of any of those which ensure the first formation of oil in-water type of dispersion and the subsequent phase reversal into water-in-oil type of dispersion. Examples of such organic solvents and dispersants may include those employed in the following methods, in which:

(1) a copolymer of an α-olefin with an α,β-unsaturated polyvalent carboxylic acid anhydride or its derivative is used as a dispersant and a hydrocarbon solvent is employed in the presence of hydroxyethyl cellulose (see Japanese Patent Kokai Publications Nos. 62-95308 and 62-95307);

(2) a sorbitan fatty acid ester having an HLB of 3–6 is used as a dispersant together with a petroleum type of aliphatic hydrocarbon solvent (see Japanese Patent Publication No. 54-30710);

(3) a nonionic surfactant having an HLB of 3–6 is used as a dispersant together with an aliphatic or alicyclic hydrocarbon solvent (see Japanese Patent Kokai Publication No. 61-157513);

(4) an oil-soluble cellulose ester or ether is used as a dispersant together with a hydrocarbon solvent (see Japanese Patent Kokai Publication No. 58-32607);

(5) a nonionic surfactant having an HLB of 6–9 is used as a dispersant together with a hydrocarbon solvent (see Japanese Patent Kokai Publication No. 57-167302);

(6) a nonionic surfactant having an HLB of 8–12 is used as a dispersant together with an aliphatic or alicyclic hydrocarbon solvent (see Japanese Patent Kokai Publication No. 56-131608);

(7) a basic nitrogen-containing polymer is used as a dispersant together with a hydrocarbon solvent (see Japanese Patent Kokai Publication No. 57-98513);

(8) a carboxyl group-containing polymer is used as a dispersant together with a hydrocarbon type of solvent (see Japanese Patent Kokai Publication No. 57-94011);

(9) a sucrose fatty acid ester is used as a dispersant together with a hydrophobic, organic solvent (see Japanese Patent Kokai Publications Nos. 61-43606 and 61-87702);

(10) a copolymer consisting of (A) 50–97 mol % of styrene and/or its alkyl substituted derivative, (B) 3–50 mol % of a dialkylaminoalkyl-acrylate or -methacrylate and/or a dialkylaminoalkyl-acrylamide or -methacrylamide and (c) 0–30 mol % of an unsaturated monomer copolymerizable with (A) and (B) is used as a dispersant together with a hydrophobic, organic solvent (see Japanese Patent Kokai Publication No. 61-40309);

(11) a sorbitan fatty acid ester and/or a sucrose fatty acid ester and a copolymer consisting of (A) 50–97 mol % of styrene and/or its alkyl-substituted derivative, (B) 3–50 mol % of a dialkylaminoalkyl acrylate or -methacrylate and/or a dialkylaminoalkyl-acrylamide or -methacrylamide and (c) 0–30 mol % of an unsaturated monomer copolymerizable with (A) and (B) are used as a dispersant together with a hydrophobic, organic solvent (see Japanese Patent Kokai Publication No. 61-53308);

(12) a mixture of a sorbitan fatty acid ester having an HLB of 3–9 with a polyoxyalkylene monoether type of nonionic surfactant is used as a dispersant together with a hydrophobic solvent (see Japanese Patent Kokai Publication No. 61-97301);

(13) a polyglycerin fatty acid ester having an HLB of 2–16 is used as a dispersant together with a petroleum type of hydrocarbon solvent (see Japanese Patent Kokai Publication No. 62-172006).

In a particularly preferable embodiment of the present invention, an aliphatic or alicyclic hydrocarbon solvent is used as the organic solvent, while a nonionic surfactant having an HLB of 3–9 is employed as the dispersant.

Water-Soluble Polymerization Initiator

The polymerization initiator used in the present invention should be soluble in water and also in the aqueous solution of a water-soluble, ethylenically unsaturated monomer mentioned above. Specific examples may include (i) hydrogen peroxides or persulfates such as potassium, sodium and ammonium persulfates, (ii) hydroperoxides such as t-butyl hydroperoxide and cumene hydroperoxide, and (iii) azo initiators such as azoisobutyronitrile and 2,2'-azobis(2-amidinopropane) dihydrochloride. Of these polymerization initiators, the oxidizing initiators in particular, e.g. persulfates or hydroperoxides may be used in combination with a reducing substance, like sodium bisulfate, L-ascorbic acid or ferrous salt, or amines to give redox initiator systems.

The amount of these water-soluble initiators used may be in the range of generally 0.01 to 10% by weight, preferably 0.1 to 2% by weight based on the water-soluble, ethylenically unsaturated monomer.

Water Soluble Crosslinking Agent

The process of the present invention may be carried out in the presence or absence of a crosslinking agent provided that the resulting polymer is permitted to have a three-dimensional structure and rendered insoluble in water or other solvents by the polymerization reaction involved or post polymerization treatments.

Crosslinking of a polymer may be effected without using a crosslinking agent by the self-crosslinking of acrylic salts, as set forth in Japanese Patent Publication No. 54-30710, or by using a crosslinking agent, thereby to make the polymer insoluble in water. As the crosslinking agents usable in the present invention, use may be made of those which contain two or more double bonds in the molecule and are copolymerizable with the water-soluble, ethylenically unsaturated monomer. Use may also be made of those crosslinking agents which have two or more functional groups capable of reacting with the functional group in the ethylenically unsaturated monomer, e.g. carboxyl group, during polymerization or post-polymerization heating and drying. These two types of crosslinking agent should be soluble in water at least to some degree and be soluble in the aqueous solution of the ethylenically unsaturated monomer.

The former type of crosslinking agents may include ethylene glycol di(meth)acrylate, diethylene glycol di(meth)acrylate, polyethylene glycol di(meth)acrylate, propylene glycol di(meth)acrylate, polypropylene glycol di(meth)acrylate, glycerin tri(meth)acrylate, N,N'-methylene bis((meth)acrylamide), diallyl phthalate, diallyl maleate, diallyl terephthalate, triallyl cyanurate, triallyl isocyanurate and triallyl phosphate.

The latter type of crosslinking agents may include ethylene glycol diglycidyl ether, polyethylene glycol diglycidyl ether and di- or poly-glycidyl ethers of aliphatic polyhydric alcohols.

In addition, compounds having both of the functions of the former and the latter, e.g. N-methylolacrylamide and glycidyl methacrylate, may also be used in the process of the present invention.

Preferable for the present invention are the former type of crosslinking agents, i.e. those which have two or more double bonds in the molecule and are copolymerizable with the water-soluble, ethylenically unsaturated monomer.

The crosslinking agents may be used alone or in admixture of two or more.

The amount of the crosslinking agents used may be in the range of 0.001 to 5% by weight, preferably 0.01 to 2% by weight based on the weight of the monomer.

Phase Reversal and Polymerization

In accordance with the process of the present invention, the water-soluble, ethylenically unsaturated monomer is polymerized by the water-in-oil type reverse-phase suspension polymerization method in a dispersion consisting of the dispersion phase of the aqueous monomer solution comprising the water-soluble, ethylenically unsaturated monomer, water, the water-soluble polymerization initiator and the optional water-soluble crosslinking agent and the continuous phase of the organic solvent containing the dispersant. The water-in-oil type of dispersion is formed by first adding the aqueous monomer solution to the organic solvent at such a temperature as to form an oil-in-water type of dispersion, and then heating the system at least to a phase-reversal temperature at which it is transformed into the water-in-oil type of dispersion.

The phase reversal temperature largely varies depending upon the polymerization conditions applied, the types of monomer, organic solvent and dispersant used as well as the composition thereof, the manner of mixing the monomer phase with the oil phase, the heating rate of the dispersion system, and other factors. In this regard, there is a report by Arai in "Industrial Materials", Vol. 19, No. 4 (1971), which teaches that the phase reversal temperature is considerably affected by the type and amount of emulsifier used, the volumetric ratio between phases, the type of hydrocarbon oil and other parameters. Taking now as an example the case where partially neutralized sodium acrylate (with a degree of neutralization of 70 mol %) is used as a monomer (at a monomer concentration of 30 % by weight in the aqueous solution), cyclohexane is used as an organic solvent and sorbitan monostearate is used as a dispersant, with the aqueous monomer solution phase to organic solvent phase ratio lying at 0.7, both said phases being mixed together under agitation, it is then noted that the phase reversal temperature is 25° C. At lower and higher than said temperature, the dispersion takes the form of an oil-in-water type of dispersion and a water-in-oil type of dispersion, respectively. In this case, therefore, an aqueous monomer solution comprising the partially neutralized sodium acrylate, water, a water-soluble polymerization initiator and, if desired, a water-soluble crosslinking agent is first mixed with the cyclohexane oil phase containing sorbitan monostearate at a temperature lower than 25° C. to form an oil-in-water type of dispersion. Then, this dispersion is transformed into a water-in-oil type of dispersion by heating under agitation to a temperature higher than 25° C., which is then subjected to polymerization reaction at a given temperature, say 60°–70° C. Mixing of the monomer phase with the oil phase containing sorbitan monostearate dispersant to form an oil-in-water type of dispersion having a temperature lower than 25° C. may be achieved, for example, by:

(1) preparing the oil phase in which sorbitan monostearate has been dissolved and the monomer phase, respectively at a temperature lower than 25° C., adding and mixing the monomer phase to and with the oil phase, (2) preparing the aqueous monomer solution at such a temperature that the mixed liquid has a temperature lower than 25° C. after mixing, mixing it with the oil phase containing sorbitan monostearate, (3) preparing the sorbitan monostearate-containing oil phase at such a temperature that the mixed liquid has a temperature lower than 25° C. after mixing, mixing it with the aqueous monomer phase, or (4) adding the aqueous monomer solution to the oil phase containing sorbitan monostearate and, then, bringing the temperature of the mixed liquid to lower than 25° C.

At such low temperatures, polymerization will not substantially proceed, even when a polymerization initiator is present in the dispersion.

Although not critical in the present invention, the polymerization temperature, which varies depending upon the types of monomer, polymerization initiator, dispersant, organic solvent and other factors, is higher than the phase reversal temperature and is generally 30°-150° C., usually 40°-100° C. Although not again critical, the polymerization time, which varies with the polymerization conditions applied, may be generally in the range of 5 minutes to 12 hours, usually 30 minutes to 10 hours.

After polymerization, the polymer is obtained in the form of beads in a wet state containing water, which may be processed into a free-flowing, powdery polymer through dehydration and if desired, post-treatments, e.g. surface crosslinking with polyglycidyl ether, and drying.

Experimental Examples

The present invention will now be explained in greater detail with reference to the following examples and comparative examples.

Example 1

In a 1-liter volume, four-necked, round flask equipped with a stirrer, a reflux condenser, a thermometer and a nitrogen feed pipe were charged 303 g of cyclohexane, to and in which 2.25 g of sorbitan monostearate with an HLB of 4.7 were added and dissolved. The flask was then maintained at an internal temperature of 20° C. while cooling with ice.

Separately, 31.2 g of caustic soda dissolved in 201 g of water were added to 75 g of acrylic acid placed in a 500-ml volume flask and externally cooled with ice, thereby neutralizing 74.9% of the carboxyl groups. In this case, the monomer concentration in water amounts to 30% by weight. Subsequently, 0.105 g of N,N'-methylene bis(acrylamide) and 0.25 g of potassium persulfate were added to and dissolved in the monomer solution, which was held at 20° C. while cooling with ice.

Next, the content of the 500-ml flask was added under agitation to the content of the four-necked flask for dispersion while ice-cooled, followed by nitrogen gas bubbling to expel dissolved oxygen. The suspension system was at an internal temperature of 21° C. and in the form of an oil-in-water type of dispersion. Then, the flask was heated in an oil bath while bubbling nitrogen gas. As a result, this oil-in-water type of dispersion was found to be transformed into a water-in-oil type of dispersion at a temperature of 25° C. With stirring continued, this dispersion was heated at a heating rate of 2.7° C./min. and held at a temperature of 60°-65° C. for 4 hours to carry out polymerization. Here stirring was effected at 250 rpm.

After the 4-hour polymerization, the temperature of the flask was further raised under agitation, whereby dehydration was performed through azeotropy of cyclohexane and water until the water content of the polymer was reduced to about 10% by weight.

Upon stopping agitation after dehydration, free-flowing, wet polymer particles settled down on the bottom of the flask, and they could easily be separated from the cyclohexane phase by decantation. The thus separated wet polymer was transferred into a vacuum drier, in which it was heated to 80°-90° C. to remove cyclohexane and water, giving a free-flowing, lump-free polymer.

Example 2 (Influence of the type of organic solvent)

The procedure of Example 1 was followed with the exception that the polymerization was carried out at a temperature of 55°-60° C., using n-hexane in place of cyclohexane. The phase reversal temperature observed in this example was 28° C., and the polymerization, dehydration and drying gave a free flowing, lump-free polymer.

Example 3 (Influence of the type of organic solvent)

The procedure of Example 1 was followed with the exception that the polymerization was carried out at a temperature of 65°-75° C., using n-heptane in place of cyclohexane. The phase reversal temperature observed in this example was 32° C., and the polymerization, dehydration and drying gave a free-flowing, lump-free polymer.

Example 4 (Influence of the type of organic solvent and the concentration of monomer)

In a 500-ml, four-necked, round flask equipped with a stirrer, a reflux condenser, a thermometer and a nitrogen feed pipe were charged 228 ml of n-hexane, to and in which 1.8 g of sorbitan monostearate with an HLB of 4.7 were added and dissolved. The flask was then maintained at an internal temperature of 15° C. while cooling with ice.

Separately, 13.1 g of an aqueous solution of caustic soda with a 95% purity, dissolved in 39 g of water, were added to 30 g of acrylic acid placed in a conical flask and externally cooled with ice, thereby neutralizing 75% of the carboxyl groups. The monomer concentration in the aqueous solution was 45% by weight. Subsequently, 0.1 g of potassium persulfate was added to and dissolved in the monomer solution, which was held at 15° C. while cooling with ice. Next, the content of the conical flask was added under agitation to the content of the four-necked flask for dispersion, followed by nitrogen gas bubbling to expel dissolved oxygen. The suspension system was at a temperature of 16° C. and in the form of an oil-in-water type of dispersion.

Then, the content of the flask was heated in an oil bath while feeding thereto a nitrogen gas in small portions. As a result, the oil-in-water type of dispersion was found to be transformed into a water-in-oil type of dispersion at a temperature of 21° C. With stirring continued, the content of the flask was then heated at a heating rate of 2.7° C./min. and held at a temperature of 60°-65° C. for 6 hours to carry out polymerization.

After the polymerization, the temperature of the flask was raised under continued agitation, whereby dehydration was performed through azeotropy of n-hexane and water until the water content of the polymer was reduced to about 10% by weight.

Upon stopping agitation after dehydration, free-flowing, wet polymer particles settled down on the bottom of the flask; they could easily be separated from n-hexane by decantation. The thus separated wet polymer was transferred into a vacuum drier, in which it was heated to 80°-90° C. to remove n-hexane and water, giving a free-flowing, lump-free polymer.

Example 5 (Influence of the manner of mixing)

In Example 1, the content of the 500-ml flask was added to the content of the 1-liter, four-necked, round flask in a stationary state, i.e., with no application of stirring. Then, the content was stirred for dispersion while cooling with ice, followed by nitrogen gas bubbling to expel dissolved oxygen. In this case, the suspension system of mixture was found to be at an internal temperature of 21° C. and in the form of an oil-in-water type of dispersion. Next, with the application of nitrogen gas bubbling, the flask's internal temperature was raised under continued agitation at 0.5° C./min. As a result, the oil-in-water type of dispersion was found to be transformed into a water-in-oil type of dispersion at a temperature of 40° C. With further continued stirring, the flask's internal temperature was raised at the same heating rate and held at 60°-65° C. for 4 hours to carry out polymerization. Here, the stirring was carried out at 250 rpm.

After the 4-hour polymerization, the temperature of the flask was raised under continued agitation, whereby dehydration was performed through azeotropy of cyclohexane and water until the water content of the polymer was reduced to about 10% by weight.

Upon stopping agitation after dehydration, free-flowing, wet polymer particles settled down on the bottom of the flask; they could easily be separated from cyclohexane by decantation. The thus separated wet polymer was transferred into a vacuum drier, in which it was heated to 80°-90° C. to remove cyclohexane and water, giving a free-flowing, lump-free polymer.

Example 6 (Influence of the heating rate)

The procedure of Example 5 was followed with the exception that the internal temperature of the flask was increased at a heating rate of 1° C./min. As a result, the oil-in water type of dispersion was found to be transformed into a water-in-oil type of dispersion at a temperature of 50° C. The same polymerization reaction, dehydration and drying as in Example 5 gave a free-flowing, lump-free polymer.

Example 7 (Influence of the type of dispersant)

The procedure of Example 1 was repeated except that diglyceryl monostearate with an HLB=5.0 was used in place of sorbitan monostearate. The phase reversal temperature observed in this example was 20° C., and the same polymerization, dehydration and drying gave a free-flowing, lump-free polymer.

Example 8 (Influence of the types of solvent and dispersant and the concentration of monomer)

In a 500-ml, four-necked, round flask equipped with a stirrer, a reflux condenser, a thermometer and a nitrogen feed pipe were charged 280 ml of n-heptane, to and in which 0.75 g of decaglyceryl pentastearate with an HLB of 3.5 was added and dissolved. The flask was then maintained at an internal temperature of 20° C.

Separately, 49.3 g of an aqueous solution of 25.4% by weight caustic soda were added to 30 g of acrylic acid and 7.5 g of water placed in a 200-ml conical flask, while cooled externally, thereby neutralizing 75 mol % of the carboxyl groups. In this case, the monomer concentration in the aqueous monomer solution amounts to 43% by weight. Next, 0.05 g of potassium persulfate was added to and dissolved in the monomer solution, which was held at an internal temperature of 20° C.

This aqueous solution of the partially neutralized salt of acrylic acid was added to the content of the four-necked flask and dispersed under agitation, followed by nitrogen gas bubbling to expel dissolved oxygen. In this case, the suspension system was found to be at a temperature of 20° C. and in the form of an oil-in-water type of dispersion. With the application of nitrogen gas bubbling, the internal temperature of the flask was increased in an oil bath. As a result, the oil-in-water type of dispersion was found to be transformed into a water-in-oil type of dispersion at a temperature of 25° C.

Then, the content of the flask was heated in an oil bath at a heating rate of 2.7° C./min., while feeding thereto a nitrogen gas in small portions, and the flask was maintained at a temperature of 55°-65° C. for 2 hours to carry out polymerization. After the polymerization, the temperature of the flask was raised under agitation, whereby dehydration was performed through azeotropy of n-heptane and water until the water content of the polymer was reduced to about 10% by weight.

Upon stopping agitation after dehydration, free-flowing, wet polymer particles settled down on the bottom of the flask; they could easily be separated from n-heptane by decantation.

The thus separated wet polymer was transferred into a vacuum drier, in which it was heated to 80°-90° C. to remove n-heptane and water, giving a free-flowing, lump-free polymer.

Comparative Example 1

The procedure of Example 1 was repeated with the exception that the oil phase comprising cyclohexane and sorbitan monostearate and the aqueous monomer solution comprising water, acrylic acid, sodium acrylate, N,N'-methylene bis(acrylamide) and potassium persulfate were each held at a temperature of 30° C. and both the phases were mixed together to obtain a suspension system having an internal temperature of 30° C. In this case, the suspension system was in the form of a water-in-oil type of dispersion. The polymerization reaction was carried out in this dispersion system.

Comparative Example 2

The procedure of Example 2 was repeated with the exception that the oil phase comprising n-hexane and sorbitan monostearate and the aqueous monomer solution comprising water, acrylic acid, sodium acrylate, N,N'-methylene bis(acrylamide) and potassium persulfate were each held at a temperature of 34° C. and both the phases were mixed together to obtain a suspension system having an internal temperature of 34° C. In this case, the suspension system was in the form of a water-in-oil type of dispersion. The polymerization reaction was carried out in this dispersion system.

Comparative Example 3

The procedure of Example 3 was repeated with the exception that the oil phase comprising n-heptane and sorbitan monostearate and the aqueous monomer solution comprising water, acrylic acid, sodium acrylate, N,N'-methylene bis(acrylamide) and potassium persulfate were each held at a temperature of 37° C. and both the phases were mixed together to obtain a suspension system having an internal temperature of 37° C. In this case, the suspension system was in the form of a waterin-oil type of dispersion. The polymerization reaction was carried out in this dispersion system.

Comparative Example 4

The procedure of Example 7 was repeated with the exception that the oil phase comprising cyclohexane and diglyceryl monostearate and the aqueous monomer solution comprising water, acrylic acid, sodium acrylate, N,N'-methylene bis(acrylamide) and potassium persulfate were each held at a temperature of 30° C. and both the phases were mixed together to obtain a suspension system having an internal temperature of 30° C. In this case, the suspension system was in the form of a water-in-oil type of dispersion. The polymerization reaction was carried out in this dispersion system.

Comparative Example 5

The procedure of Example 8 was repeated with the exception that the oil phase comprising n-heptane and decaglycerin pentastearate and the aqueous monomer solution comprising water, acrylic acid, sodium acrylate and potassium persulfate were each held at a temperature of 30° C. and both the phases were mixed together to obtain a suspension system having an internal temperature of 30° C. In this case, the suspension system was in the form of a water-in-oil type of dispersion. The polymerization reaction was carried out in this dispersion system.

For the polymers obtained in the above examples and comparative examples, measurements were conducted on the saline solution absorption, amount of organic solvent residue, particle size distribution and mean particle size by the following methods. The results are shown in Table 1.

1) Saline Solution Absorption

About 1 g of a polymer sample and about 200 g of a saline solution having a concentration of 0.9% by weight were respectively weighed and placed in a 300-ml beaker. After stirring, the content of the beaker was allowed to stand for about 60 minutes, causing the polymer to be sufficiently swollen with the saline solution. Next, the beaker content was drained through a 100-mesh filter, and the amount of the swollen gel was measured. The saline solution absorption of each polymer was calculated by the following equation:

$$\text{Saline Solution Absorption (g/g)} = \frac{\text{Amount of Swollen Gel (g)}}{\text{Amount of Polymer (g)}}$$

2) Amount of Organic Solvent Residue

About a few tens mg of a polymer was precisely weighed and placed in a heating furnace type of thermal decomposer unit in which it was subjected to thermal extraction at 270° C. for 10 minutes in the presence of a helium stream. The thus extracted organic solvent was cold-trapped at the end of a gas chromatograph's separation column to determine its amount with a capillary column designed exclusively for hydrocarbons (and provided with a hydrogen flame ionization sensor). This operation was further repeated until no trace of the organic solvent was extracted. The amount of organic solvent residue is determined by adding up the measurements.

3) Particle Size Distribution

ASTM standard sieves of 20, 40, 60, 80, 100, 150, 200, 270 and 325 mesh were combined with one another in the above order from the top together with a receiving dish, and about 30 g of a polymer sample was loaded on the top sieve and shaken for 1 minute with a Ro-Tap type of automatic sieve shaking machine. Afterwards, the oversize polymer fraction on each sieve was weighed and calculated with respect to the total amount of 100%. The thus determined particle size distribution is a mass base distribution.

4) Mean Particle Size

The cumulative undersize percentages (on mass basis) are plotted on a diagram with particle size as logarithmic-scale abscissa and a probability scale as ordinate, and the mean particle size is defined by a particle size when the cumulative undersize percentage is 50%.

TABLE 1

| Example No. | Saline Solution Absorption (g/g) | Organic Solvent Residue (wt ppm) | Particle Size Distribution (wt %) | | | | | | | | | | Mean Particle Size (μm) |
|---|---|---|---|---|---|---|---|---|---|---|---|---|---|
| | | | #20 or larger | #20~#40 | #40~#60 | #60~#80 | #80~#100 | #100~#150 | #150~#200 | #200~#270 | #270~#325 | #325 or smaller | |
| Ex. 1 | 89 | 4 | 0.3 | 2.1 | 35.2 | 37.2 | 13.8 | 9.6 | 2.3 | 0.1 | 0 | 0 | 220 |
| Ex. 2 | 62 | 12 | 1.2 | 9.6 | 65.2 | 12.5 | 9.9 | 1.1 | 0.5 | 0 | 0 | 0 | 290 |
| Ex. 3 | 93 | 53 | 0 | 0 | 0.1 | 2.7 | 8.2 | 40.0 | 26.2 | 14.9 | 7.9 | 0 | 100 |
| Ex. 4 | 85 | 62 | 0 | 0 | 0 | 0.1 | 2.6 | 9.2 | 68.4 | 18.9 | 0.7 | 0.1 | 80 |
| Ex. 5 | 80 | 10 | 0.1 | 4.9 | 50.8 | 24.2 | 19.1 | 0.6 | 0.2 | 0.1 | 0 | 0 | 250 |
| Ex. 6 | 83 | 8 | 2.6 | 62.9 | 30.2 | 3.3 | 0.9 | 0.1 | 0 | 0 | 0 | 0 | 425 |
| Ex. 7 | 85 | 4 | 0 | 0.4 | 21.7 | 50.6 | 19.2 | 7.1 | 0.4 | 0.5 | 0.1 | 0 | 200 |
| Ex. 8 | 89 | 5 | 0.1 | 34.2 | 58.0 | 6.5 | 1.0 | 0.1 | 0.1 | 0 | 0 | 0 | 340 |
| Comp. Ex. 1 | 88 | 236 | 0 | 0.1 | 13.0 | 15.2 | 17.9 | 20.3 | 19.9 | 10.6 | 2.4 | 0.6 | 130 |
| Comp. Ex. 2 | 61 | 1609 | 0 | 11.6 | 20.9 | 14.5 | 9.2 | 10.0 | 17.2 | 9.9 | 5.2 | 1.5 | 170 |
| Comp. Ex. 3 | 92 | 2894 | 0 | 0 | 0 | 0.1 | 2.9 | 9.7 | 16.2 | 24.9 | 24.1 | 22.1 | 55 |
| Comp. Ex. 4 | 82 | 365 | 0 | 0 | 16.1 | 13.2 | 11.3 | 19.4 | 20.5 | 16.6 | 1.7 | 1.2 | 120 |
| Comp. Ex. 5 | 85 | 472 | 0 | 14.9 | 28.8 | 15.7 | 14.6 | 9.5 | 7.4 | 5.3 | 3.2 | 0.6 | 210 |

What is claimed is:

1. A process for producing a highly water absorptive polymer by polymerizing a water-soluble, ethylenically unsaturated monomer in a water-in-oil type of dispersion consisting of the dispersion phase of an aqueous monomer solution comprising the water-soluble, ethylenically unsaturated monomer, water, a water-soluble polymerization initiator and an optional water-soluble crosslinking agent and the continuous phase of an organic solvent containing a dispersant, characterized in that said aqueous monomer solution is added to said organic solvent at such a temperature as to form an oil-in-water type of dispersion, and the oil-in-water type of dispersion is then heated at least to a phase reversal temperature at which it is transformed into said water-in-oil type of dispersion.

2. The process according to claim 1, wherein the water-soluble, ethylenically unsaturated monomer comprises as a main component acrylic acid with 50–95% of the total carboxyl groups neutralized as an alkali metal or ammonium salt.

3. The process according to claim 1, wherein the concentration of the water-soluble, ethylenically unsaturated monomer in the aqueous monomer solution ranges from 20% by weight to the saturation concentration.

4. The process according to claim 1, wherein the organic solvent is an aliphatic or alicyclic hydrocarbon solvent and the dispersant is a nonionic surfactant with an HLB of 3–9.

5. The process according to claim 1, wherein the polymerization is carried out at 40°–100° C. for 30 minutes to 10 hours.

6. The process according to claim 1, wherein the temperature at which polymerization occurs of 30°–150° C. is greater than the phase reversal temperature of the process.

7. The process according to claim 1, wherein said water-soluble cross-linking agent is present in an amount ranging from 0.001 to 5% by weight based on the weight of monomer.

8. A process for producing a highly water-absorptive polymer, comprising:
   forming an aqueous monomer solution of a water-soluble, ethylenically unsaturated monomer, water, a water-soluble polymerization initiator and an optional water-soluble crosslinking agent and adding the solution to an organic solvent at a temperature at which an oil-in-water dispersion is formed;
   heating the oil-in-water dispersion to a temperature sufficient to transform the dispersion into a water-in-oil dispersion;
   conducting polymerization of monomer in the water-in-oil dispersion in which the aqueous phase is dispersed in the continuous phase of the organic solvent containing a dispersant.

* * * * *